United States Patent [19]

Cavanna et al.

[11] 4,022,858

[45] May 10, 1977

[54] METHOD FOR THE PRODUCTION OF FOAMED THERMOPLASTIC FILM HAVING IMPROVED RESILIENCY AND FLEXIBILITY CHARACTERISTICS

[75] Inventors: Anthony John Cavanna, Pittsford; Edward Armando Colombo, Fairport, both of N.Y.

[73] Assignee: Mobil Oil Corporation, New York, N.Y.

[22] Filed: Dec. 26, 1974

[21] Appl. No.: 536,495

Related U.S. Application Data

[63] Continuation of Ser. No. 320,428, Jan. 2, 1973, abandoned.

[52] U.S. Cl. .............................. 264/51; 260/2.5 E; 264/210 R; 264/237; 264/DIG. 4; 264/DIG. 5; 264/DIG. 13
[51] Int. Cl.² ...................... B29D 7/22; B29D 27/00
[58] Field of Search ............... 264/48, 51, DIG. 13, 264/DIG. 5, DIG. 4, 237, 209, 210 R; 260/2.5 E

[56] References Cited

UNITED STATES PATENTS

| | | | |
|---|---|---|---|
| 3,194,864 | 7/1965 | Richie | 264/51 |
| 3,200,176 | 8/1965 | Baxter | 264/54 |
| 3,233,025 | 1/1966 | Frye et al. | 264/54 X |
| 3,299,192 | 1/1967 | Lux | 264/48 |
| 3,525,125 | 8/1970 | Berger et al. | 264/48 |

OTHER PUBLICATIONS

Frisch, Kurt C. and James H. Saunders, editors, "Plastic Foams", vol. 1, Part II, New York, Marcel Dekker, Inc., 1973, pp. 831–840, 852, 853.

Primary Examiner—Philip Anderson
Attorney, Agent, or Firm—Charles A. Huggett; James D. Tierney

[57] ABSTRACT

Improvements in the production of foam form film or sheeting plastic products in order to increase the flexibility characteristics thereof by reducing the size of the voids and increasing the number of voids therein without substantially changing the bulk density, production rate or product size and by reducing the rate at which such foamed products solidify after formation.

5 Claims, 2 Drawing Figures

METHOD FOR THE PRODUCTION OF FOAMED THERMOPLASTIC FILM HAVING IMPROVED RESILIENCY AND FLEXIBILITY CHARACTERISTICS

This is a continuation of application Ser. No. 320,428, filed Jan. 2, 1973, and now abandoned.

This invention relates to the production of thermoplastic foam. It more particularly refers to thermoplastic foam form film or sheeting having improved flexibility.

It is known to continuously extrude polystyrene or other thermoplastic material in such a manner as to form a foam sheet. For this use, the polystyrene is compounded with a suitable blowing (foaming) composition including a nucleating agent and a volatile material. The polystyrene and blowing composition are suitably compounded in a first extruder operating with a given temperature and pressure profile. As this composition passes through the first extruder, it is heated, homogenized and pressurized to a desirable extent. It is then transferred to a second extruder operating at a lower temperature than the first extruder which serves to cool the homogenized composition such that upon extrusion through the die lips, the blowing agent vaporizes and foams the extruded polystyrene. As the polystyrene is extruded and foamed into a film or sheeting (depending upon the thickness), the extrudate must be cooled in order to set the foam structure and prevent the polystyrene matrix from collapsing. In one commercial operation, the polystyrene composition is extruded through a circular die to form a tube of foam form film. This tube is suitably stretched over a forming mandrel through which cooling water is passed and then slit to form flat foam form film. The flat film is suited to use as raw material for thermoforming such into appropriate shapes, such as meat trays, disposable plates, foam cups and the like.

In the meat tray field, the tray is used as a carrier for meat, usually in supermarkets. In use, the butcher or wrapper places the cut or chopped meat on the tray, wraps it in clear thermoplastic film, heat seals the film around the tray and meat and then puts the package in the meat counter. Customers pick up the package, inspect the contents and buy or not. One of the requirements of the commercially acceptable meat tray is that it be strong and resilient enough to not break when lifted by its corner. Unfortunately, although the corner of the meat tray may be the weakest structural part of the tray, it is the part by which most shoppers, packers and butchers pick up the tray. Meat trays, are therefore, commercially acceptable or not depending upon their tendency to "corner break".

One readily apparent means of improving the resistance to corner breaking is to use a different, inherently stronger, polymer. Another is to use more polymer (that is produce a product having a higher bulk density). All of these obvious solutions to the corner break problem introduce further problems into the total tray formation process so that in sum total, while the corner break problem might be solved, the cost would be prohibitive.

It is, therefore, an object of this invention to produce a thermoplastic foam article having improved flexibility.

It is another object of this invention to produce a thermoplastic foam article having improved flexibility which is otherwise substantially identical to such articles produced in the past.

It is a further object of this invention to provide polystyrene foam trays having improved resistance to corner break.

Other and additional objects of this invention will become apparent from a consideration of this entire specification including the claims hereof.

Figure 1:
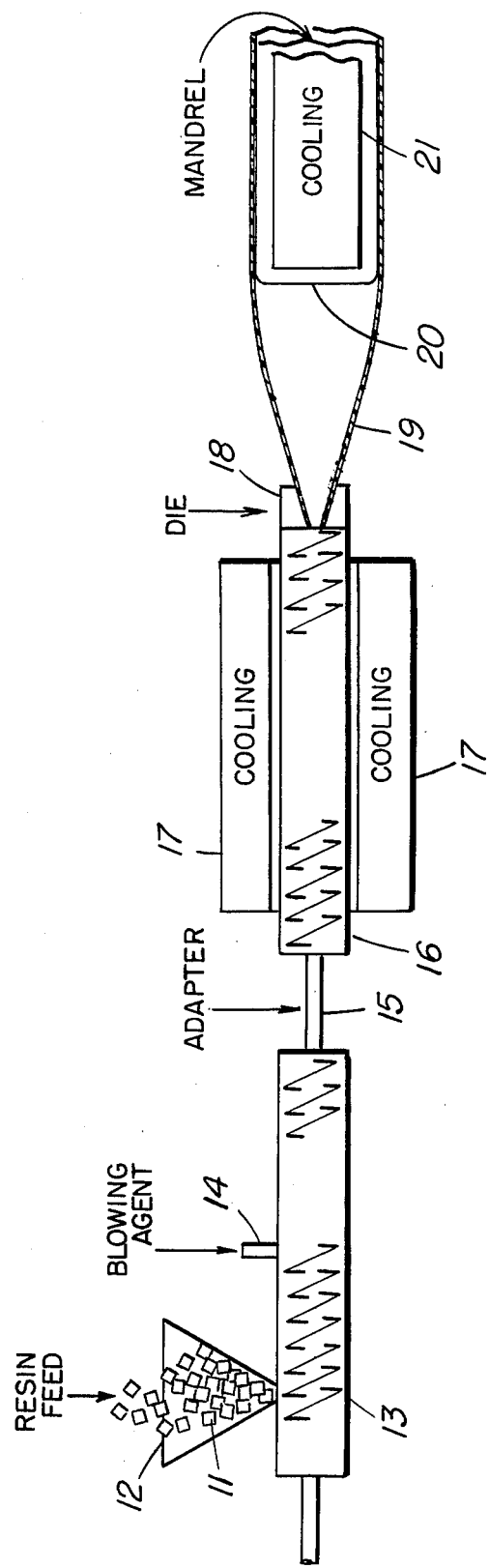
FIG. 1 is a schematic illustration of one form of extrusion apparatus assembly which may be employed in the process of the present invention.

One aspect of the present invention resides in a novel process of producing foam for thermoplastic film or sheeting having the same overall physical properties, that is size, density, production rate, etc., as the prior art, but wherein the product which is produced has significantly improved resiliency and flexibility characteristics. Accordingly, the existing process of producing foam thermoplastic sheet or film is improved by utilizing as the thermoplastic film or sheet-forming composition a mixture of 93 to 97 parts by weight of thermoplastic resin, 3 to 7 parts by weight of blowing agent, and 0.4 to 0.6 parts by weight of nucleating agent. Extruding this composition is accomplished in the prior art manner, that is, by heating and plastifying the thermoplastic resin in a first extruder; adding blowing agent and nucleating agent to the composition in the first extruder; thoroughly mixing all of the constituents of the composition in the first extruder; transferring the now fluid thermoplastic mixture to a second extruder operating at such a temperature and throughput rate as to effectively cool the thermoplastic mixture therein; forcing the contents of the second extruder through a film or sheet-forming die into a zone of significantly reduced pressure and temperature as compared to the temperature and pressure inside the second extruder; and thereby forming said composition into a sheet or film while simultaneously foaming the extrudate.

The foamed extrudate is then contacted with a cooling means. In order to set the foam structure of the extrudate, the polymer matrix must be substantially solidified to prevent the cell voids from collapsing. Since the polymer is a thermoplastic, this setting is accomplished by lowering the temperature of the foam to below the plastic temperature of the polymer. The specific amount of cooling required is dependent upon the specific polymer being formed into foam sheet and the temperature of sheet formation. In the case of polystyrene, where the foam sheeting is formed by extrusion through a circular die, the temperature of the polymer at the die is about 250° to 300° F and therefore about 35 to 60 BTU per pound of polymer must be removed after extrusion in order to set the foam. In the past, the tubular foam sheeting was stretched over a forming drum or mandrel through which was passed water at about 40° to 50° F at a rate of about 1 to 4 gals. per min. In the past this drum had a length to diameter ratio of about 2.5 to 3.5. According to this invention this ratio has been significantly increased to about 4.0 to 5.0. It has now been found that in combination with an increased proportion of nucleating agent, a decreased cooling rate produces significantly improved foam form product. According to the invention, the preferred cooling rate is about 500 to 600 BTU per minute, or a decrease in cooling rate by a factor of about 0.2 to 0.6. If the size and the volume of the foam form film is kept constant, this decreased cooling rate is a function of the water temperature and throughput, and, assuming a constant mandrel diameter, the mandrel length.

The foamed sheet or film thus formed has a bulk density of about 3.5 to 20 lb/in$^3$, substantially the same as prior art produced foamed stock. However, and most importantly, the size of the individual foam cells has been significantly reduced from an average of about 6 to 10 cells in 4 in$^2$ when viewed in two dimensions at a magnification of 100 times to an average of 25 to 55 cells in 4in$^2$ when viewed in two dimensions at a magnification of 100 times.

It is remarkable that this apparently simple change has made it possible to increase the resiliency and flexibility characteristics of the meat tray products formed from the foam form extrudate about 90% when such meat trays are tested as described below. For example, a series of generally rectangular trays measuring 7 to 9 inches and having a nominal wall thickness of 0.150 inch are held at one corner and a weight of 1 pound placed in about the geometric center of the tray. The number of trays whose corners break during the test is determined and expressed as a percent. The lower the percentage, the better the flexural strength of the product.

By way of comparison, trays thermoformed from 0.100 inch thick foam having an average of about 6 to 10 cells per 4 square inches when viewed in two dimensions at a magnification of 100 times showed substantially 100% corner breaks, whereas otherwise identical trays having about 25 to 55 cells per 4 square inches showed substantially no corner breaks.

The foaming agent used in producing product according to this invention may be of the low boiling, inert type or one of the chemically decomposing type. Many examples of both trays of foaming agents are well known in the plastic art. For example, the chemically decomposing type of foaming agent is illustrated by azodicarbonamide, whereas the inert, low boiling type of foaming agent is illustrated by pentane. No invention is here claimed in the specific foaming agent or type of foaming agent used since it is believed that the improvements obtained according to this invention are unrelated to the nature of the foaming agent.

As noted above, a nucleating agent is introduced into the foam forming composition prior to extrusion thereof. Those nucleating agents which are useful in the practice of this invention are illustrated by talc, sodium bicarbonate and citric acid and a combination, thereof. While in the past the nucleating agent was added in a proportion of about 0.05 to 0.2 percent by weight of thermoplastic resin, it has been found to be critical to the practice of this invention to utilize the nucleating agent in a proportion of about 0.4 to 0.6 weight percent. The preferred nucleating agent is sodium bicarbonate and citric acid.

Foamable thermoplastic resins are per se well known in the plastics art. The most common examples of such materials are polyvinyl chloride, polyurethanes, and polystyrenes. While this invention is applicable to all of these resins, it is particularly and peculiarly well suited to use in producing foamed polystyrene or styrene copolymers.

Resin feed pellets 11, such as polystyrene resin pellets which have been coated with a mixture of sodium bicarbonate and citric acid powder, are fed into hopper 12 which feeds into screw extruder 13. In extruder 13 the resin feed is melted and advanced to a blowing agent injection port 14 whereat a blowing agent such as, for example, pentane or isopentane is injected into the molten polymer mass. After the blowing agent, resin feed, and nucleating agent have been thoroughly mixed the molten mass is passed through adapter 15 into a second rotating screw extruder 16 which serves to cool the molten mass as it is forwarded to die member 18. Extruder 16 is jacketed with cooling elements 17 through which coolant fluids are circulated. Finally the molten mass is extruded through die 18 in the form of a foam tube 19. Foam tube 19 is subsequently drawn over the surface of cylindrical internal mandrel 20 which is internally cooled by coolant fluids 21 circulating therein. The foam tube 19 may be subsequently flattened and passed to a wind-up operation (not shown) or alternatively the tube may be slit and flattened into a single layer sheet utilizing conventional means (not shown).

Figure 2:
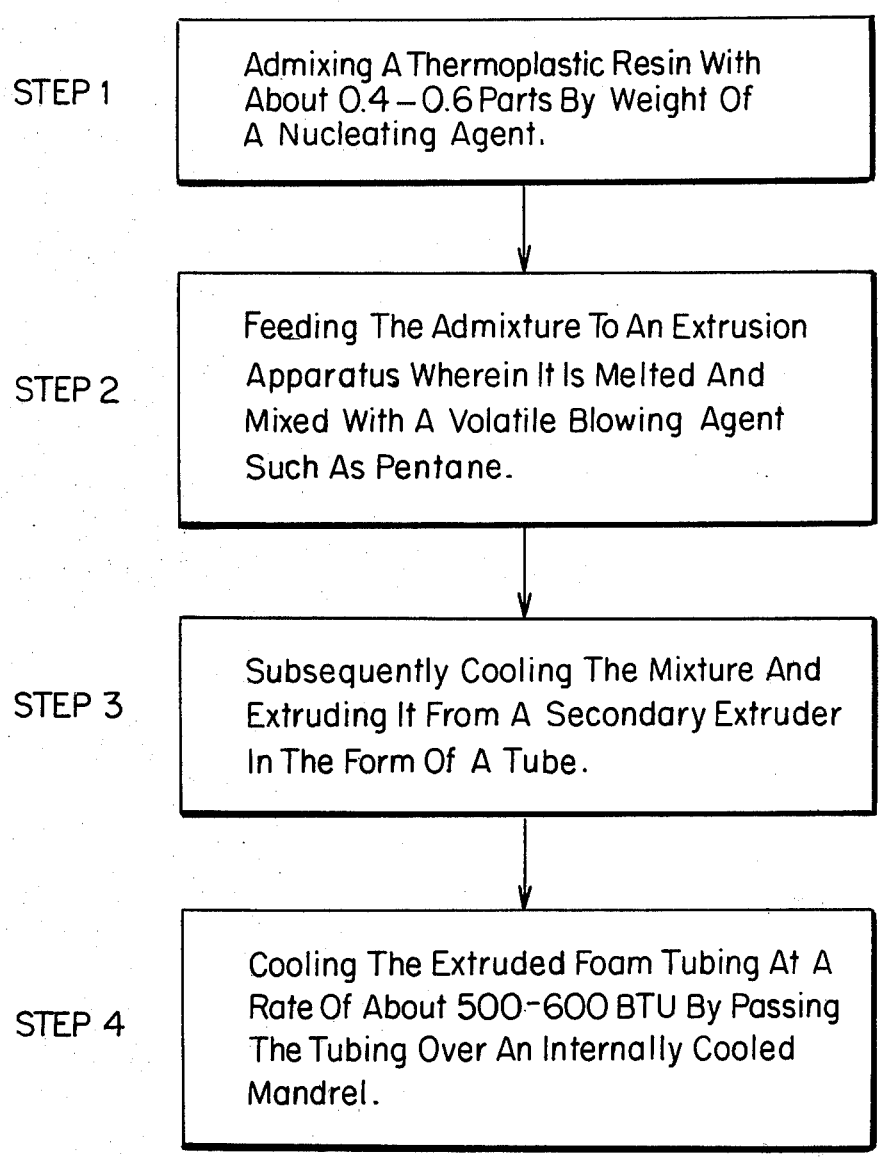
FIG. 2 is a flow sheet of a process in accordance with the present invention.

FIG. 2 is a flow sheet outlining a specific embodiment of the process of the present invention.

The following specific example will serve to illustrate this invention without being in anyway limiting to the scope thereof. All parts and percentages are by weight unless expressly stated to the contrary.

A foam forming composition was formed of 50 parts virgin polystyrene having a melt index of 3 and 50 parts of reclaimed scrap polystyrene having a melt index of 10.

This resin blend was then dry blended with a nucleating agent 0.5 parts by weight. The total blend was plastified by heating and hot working in a first extruder at about 450° F. The plastified blend is then mixed with 5 parts of pentane blowing agent by injecting said blowing agent into the first extruder to form a foamable composition. The foamable composition was then transferred to a second extruder operating at a lower temperature of about 200° F, where it is cooled; the cooled foamable composition was then extruded through a circular die having a diameter of about 2.5 inches and a gap of 25 mils into the atmosphere whereupon it foamed into a tube which was passed about a forming mandrel about 13.4 inches in diameter and about 5 feet long. Water at about 65° F was passed through the mandrel at a rate of 11 gallons per minute.

The resultant foam tube was slit into a flat film 42 inches wide, 0.100 inches thick having about 35 void cells per 4 square inches of surface when viewed in two dimensions at 100 times magnification (one side) and a bulk density of 4.5 pounds per cubic foot.

What is claimed is:

1. In a process for the production of thermoplastic foamed film or sheeting by plastifying a thermoplastic resin, blending such with a nucleating agent and a foaming agent, extruding such blend in the form of tubular film of sheeting while simultaneously foaming said film or sheeting, and cooling said foamed tubular film or sheeting to an extent sufficient to stabilize said foamed tubular film or sheeting; the improvement, whereby increasing the flexural characteristic of said foamed tubular film or sheeting, and products made therefrom which comprises utilizing about 0.4 to 0.6 parts by weight of said nucleating agent per 100 parts of said resin, and cooling said foamed tubular film or sheeting at a rate of about 500 to 600 BTU per minute, whereby providing about 25 to 55 void cells per 4in$^2$ of said foamed tubular film or sheeting, when viewed in two dimensions at 100 times magnification.

2. The improved process claimed in claim 1 wherein said resin is a styrene polymer and said foamed tubular film or sheeting has a bulk density of about 3.5 to 20 pounds per cubic foot.

3. The improved process claimed in claim 2 wherein said nucleating agent is a mixture of sodium bicarbonate and citric acid wherein the citric acid is present to the extent of 76% by weight of the sodium bicarbonate.

4. The improved process claimed in claim 2 including plastifying said styrene polymer at about 400° to 500° F, mixing said plastisized polymer with blowing and nucleating agents to form a blend, cooling said blend by transferring said blend to a second extruder and extruding said blend in the form of foamed tubular film or sheeting under ambient atmospheric conditions which are lower in both temperature and pressure than the conditions of said blending.

5. The improved process claimed in claim 2 wherein said extruded foamed tubular film or sheeting is passed about a mandrel having a length to diameter ratio of about 4 to 5 and passing water at about 60° to 75° F through said mandrel at a rate of about 7 to 15 gallons per minute sufficient to cool and dimensionally stabilize said foamed tubular film or sheeting.

* * * * *